United States Patent
Alby et al.

(10) Patent No.: US 12,054,271 B2
(45) Date of Patent: Aug. 6, 2024

(54) METHOD FOR ASSEMBLING AN AIRCRAFT PYLON AND AIRCRAFT PYLON OBTAINED BY THIS METHOD

(71) Applicants: Airbus SAS, Blagnac (FR); Airbus Operations SAS, Toulouse (FR)

(72) Inventors: Sebastien Alby, Toulouse (FR); Jean Geliot, Toulouse (FR); Thomas Deforet, Toulouse (FR); Olivier Dubois, Toulouse (FR); Joël Dedieu, Toulouse (FR); Xavier Bardey, Blagnac (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 195 days.

(21) Appl. No.: 17/391,825

(22) Filed: Aug. 2, 2021

(65) Prior Publication Data
US 2022/0041293 A1 Feb. 10, 2022

(30) Foreign Application Priority Data
Aug. 4, 2020 (FR) ...................................... 2008257

(51) Int. Cl.
*B64D 27/40* (2024.01)
*B64F 5/10* (2017.01)

(52) U.S. Cl.
CPC ................ *B64D 27/40* (2024.01); *B64F 5/10* (2017.01)

(58) Field of Classification Search
CPC ...... B64D 27/26; B64D 2027/262; B64F 5/10
See application file for complete search history.

(56) References Cited

U.S. PATENT DOCUMENTS

| | | | | |
|---|---|---|---|---|
| 6,862,852 | B1* | 3/2005 | Beele | F16L 5/04 |
| | | | | 52/220.8 |
| 8,474,750 | B2* | 7/2013 | Marche | B64D 27/26 |
| | | | | 244/54 |
| 2012/0324907 | A1* | 12/2012 | Waldron | B64D 29/06 |
| | | | | 60/797 |

(Continued)

FOREIGN PATENT DOCUMENTS

| | | |
|---|---|---|
| EP | 3683149 A1 | 7/2020 |
| FR | 2931133 A1 | 11/2009 |
| FR | 3059648 A1 | 6/2018 |

OTHER PUBLICATIONS

French Search Report; priority document.

*Primary Examiner* — Michael H Wang
(74) *Attorney, Agent, or Firm* — Greer, Burns & Crain, Ltd.

(57) ABSTRACT

A method for assembling an aircraft pylon including a primary structure and at least one internal system positioned at least partially within the primary structure, wherein the assembly method includes a first step of assembling a part of the primary structure so that the interior of the primary structure remains accessible, a step of mounting an internal systems module including at least one support and at least one internal system connected to the support, a second step of assembling the internal systems module and the partially assembled primary structure, a third step of assembling any element of the primary structure not assembled in the first assembly step, and an aircraft pylon assembled by such a method.

12 Claims, 4 Drawing Sheets

(56) References Cited

U.S. PATENT DOCUMENTS

| | | | |
|---|---|---|---|
| 2015/0013142 A1* | 1/2015 | West | B64D 27/26 |
| | | | 29/525.08 |
| 2015/0166192 A1* | 6/2015 | Ewens | B64F 5/40 |
| | | | 244/54 |
| 2016/0221682 A1* | 8/2016 | Pautis | B64D 27/18 |
| 2017/0043878 A1* | 2/2017 | Pautis | F01D 25/28 |
| 2017/0259906 A1* | 9/2017 | Connelly | B64D 33/04 |
| 2020/0017227 A1* | 1/2020 | Deforet | B64D 27/18 |
| 2020/0231294 A1 | 7/2020 | Martinel et al. | |

* cited by examiner

METHOD FOR ASSEMBLING AN AIRCRAFT PYLON AND AIRCRAFT PYLON OBTAINED BY THIS METHOD

CROSS-REFERENCES TO RELATED APPLICATIONS

This application claims the benefit of the French patent application No. 2008257 filed on Aug. 4, 2020, the entire disclosures of which are incorporated herein by way of reference.

BACKGROUND OF THE INVENTION

The present application relates to a method for assembling an aircraft pylon, and to an aircraft pylon obtained by this method.

According to a configuration shown in FIGS. 1 and 2, an aircraft 10 comprises multiple propulsion units 12 positioned below the wing 14 of the aircraft 10.

A propulsion unit 12 comprises an engine 16, a nacelle (not shown in FIG. 2) positioned around the engine 16, and a pylon 18 that provides the connection between the engine 16 and the wing 14. The pylon 18 comprises a rigid primary structure 20 which, among other things, serves to transmit forces between the engine 16 and the rest of the aircraft 10, and a secondary structure 22 (shown in FIG. 4) which encloses the primary structure 20 and reduces the drag of the pylon 18. According to one configuration, the primary structure 20 is connected to the engine 16 by an engine attachment 24 and to the wing 14 by a wing attachment 26.

For the present application, a longitudinal direction X is a direction parallel to the engine axis A16. A horizontal transverse direction Y is a horizontal direction perpendicular to the engine axis A16. A vertical transverse direction Z is a vertical direction perpendicular to the engine axis A16. A vertical longitudinal plane is a plane parallel to the longitudinal direction X and the vertical transverse direction Z.

The terms "front" and "rear" refer to a direction of advance of the aircraft 10 that takes place as a consequence of the thrust produced by the propulsion units 12, this direction being represented by the arrow 28 in FIG. 1.

As shown in FIGS. 3 and 4, the primary structure 20 comprises:
an upper spar 30,
a lower spar 32,
intermediate reinforcements 34 which connect the upper and lower spars 30, 32, are arranged in transverse planes and each have an approximately square or rectangular contour,
a front reinforcement 36 which connects a front end of the upper spar 30 and a front end of the lower spar 32,
a rear reinforcement 38 which connects a rear end of the upper spar 30 and a rear end of the lower spar 32,
first and second lateral panels 40, 42 which are arranged on either side of the intermediate, front and rear reinforcements 34, 36, 38.

As shown in FIG. 4, the pylon 18 also comprises internal systems 44 that are positioned inside the primary structure 20, and external systems 46 that are positioned outside the primary structure 20, between the latter and the secondary structure 22.

According to one assembly mode, described, for example, in document FR2931133A1, the various elements of the primary structure (the upper and lower spars 30, 32, the intermediate, front and rear reinforcements 34, 36, 38 and the first and second lateral panels 40, 42) are assembled so as to obtain a hollow box with closed upper, lower and lateral faces. All that remains after this assembly step is just small openings in the upper and lower spars 30, 32 and in the first and second lateral panels 40, 42, for access to the interior of the primary structure 20.

After this, the internal systems 44 are positioned one after the other inside the primary structure 20. After this, the external systems 46 are positioned around the primary structure 40, then the secondary structure 22 is installed.

According to this operating mode, accessibility for installing the internal systems 44 within the already-assembled primary structure 20 is limited, which can sometimes make the installation of the systems long and complex for the operators. Furthermore, the fact of installing these internal systems 44, one after the other in the primary structure 20, tends to significantly increase the time required for assembly of the pylon.

SUMMARY OF THE INVENTION

The present invention seeks to remedy all or some of the drawbacks of the prior art.

To that end, the invention relates to a method for assembling an aircraft pylon comprising a primary structure comprising upper and lower spars and first and second lateral panels, a secondary structure capping the primary structure, at least one internal system positioned at least partially inside the primary structure and at least one external system positioned between the primary structure and the secondary structure, characterized in that the assembly method comprises:

a first step of assembling a subassembly comprising at least one of the upper and lower spars and at least one of the first and second lateral panels, a step of mounting an internal systems module comprising at least one internal system and at least one support to which the internal system is connected, a second step of assembling the internal systems module and the subassembly assembled in the first assembly step, and during the second assembly step, each support for the internal systems module is connected to at least one upper or lower spar, and/or at least one first or second lateral panel of the subassembly assembled in the first assembly step, a third step of assembling those element(s) of the primary structure not assembled in the first assembly step, a step of installing and securing the external systems and the secondary structure.

After the first step, the primary structure is only partially assembled, and hence the interior of the primary structure is largely accessible, which makes it easier to install the internal systems. According to the invention, all of the internal systems are positioned in the primary structure in a single step, which helps to reduce, in particular, the time for assembling the pylon. Since the internal systems are connected to supports prior to assembly of the internal systems module and the subassembly assembled in the first assembly step, this also helps to reduce the time for assembling the pylon.

According to one feature, the upper and lower spars, the first and second lateral panels and the supports are pre-drilled before being assembled, and during the first, second and third assembly steps, the upper and lower spars, the first and second lateral panels and the supports are positioned relative to one another in such a way that holes line up in order to be able to receive fasteners, and then the fasteners are installed.

According to a first embodiment, the internal systems module comprises multiple mutually independent supports.

According to a second embodiment, the internal systems module comprises multiple supports that are connected to one another by longitudinal stiffeners.

According to another feature, each support is in the form of a frame, the internal systems module comprises multiple internal systems, and the internal systems are connected to the supports and/or to the longitudinal stiffeners by connectors so as to keep the internal systems from moving relative to the supports and relative to the longitudinal stiffeners.

According to another feature, each support comprises at least one through-hole through which there passes an internal system and first and second parts that meet at a junction plane, the first and second parts comprising, for each through-hole, first and second semi-cylindrical shapes delimiting the through-hole when the first and second parts meet.

According to another feature, the internal system passing through the through-hole is cylindrical at least in line with the through-hole. In parallel, the through-hole is cylindrical and has a diameter substantially equal to that of the internal system.

According to another feature, each of the first and second parts of the support comprises a comb made of elastomeric material, having a semi-cylindrical shape for each through-hole.

The invention also relates to an aircraft pylon obtained by the assembly method as set out in one of the preceding features, wherein the aircraft pylon comprises a primary structure and an internal systems module comprising at least one internal system and at least one support to which the internal system is connected, the internal systems module being positioned inside the primary structure, each support of the internal systems module being connected to the primary structure.

BRIEF DESCRIPTION OF THE DRAWINGS

Other features and advantages will emerge from the following description of the invention, which description is given solely by way of example, with reference to the appended drawings in which.

DETAILED DESCRIPTION OF THE PREFERRED EMBODIMENTS

Figure 1:
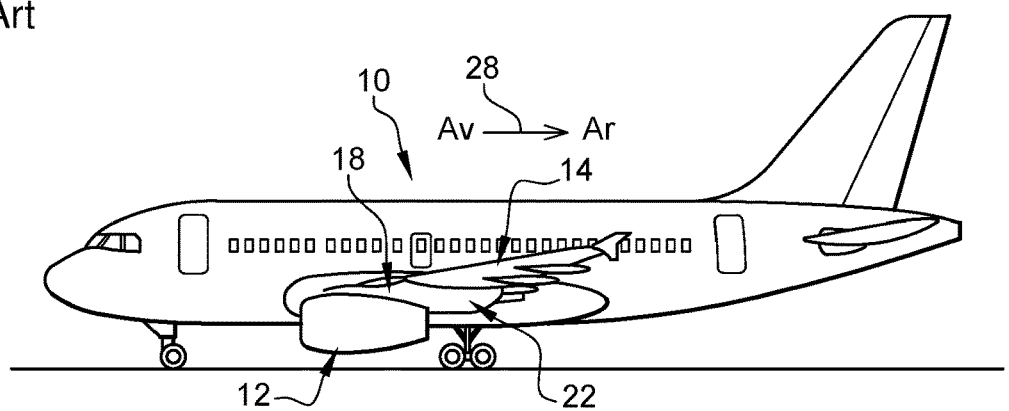
FIG. 1 is a side view of an aircraft.
Figure 2:
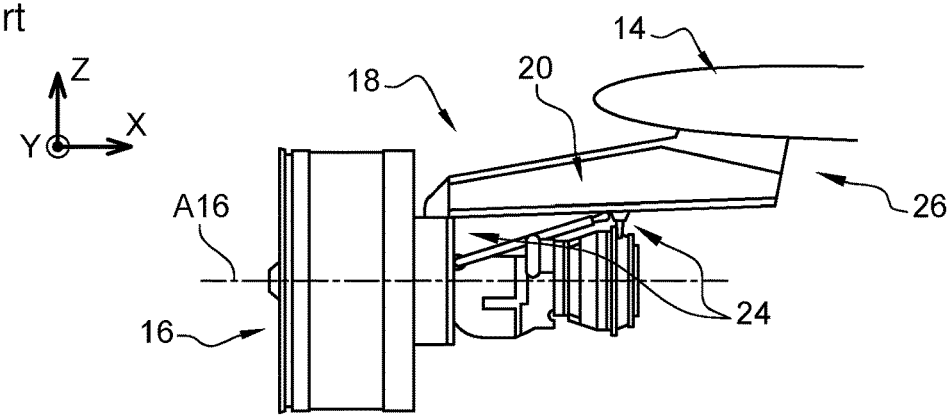
FIG. 2 is a side view of a primary structure of a pylon connecting an engine to a wing, illustrating one embodiment.
Figure 3:
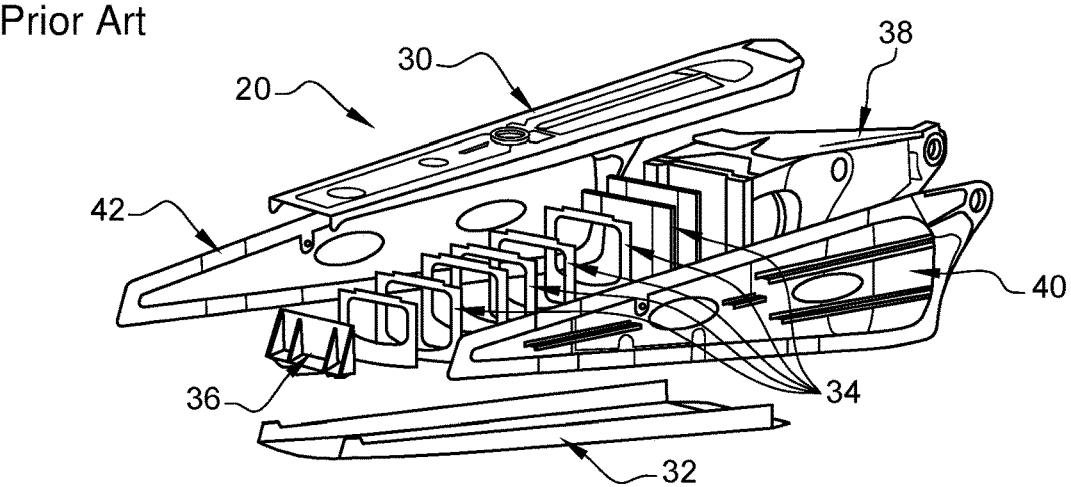
FIG. 3 is an exploded perspective view of a primary structure of a pylon, illustrating one embodiment of the prior art.
Figure 4:
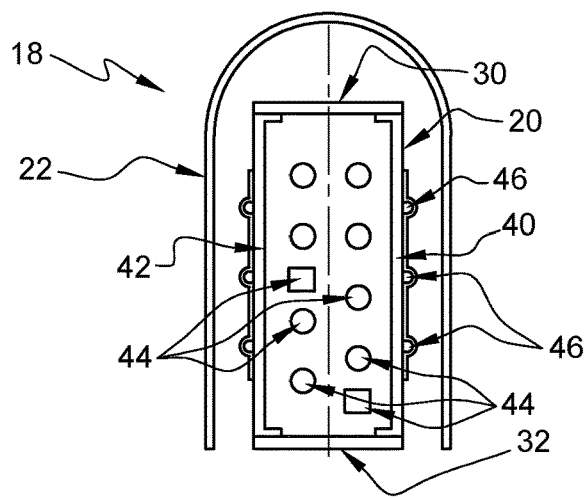
FIG. 4 is a cross section through an aircraft pylon, illustrating an embodiment of the prior art.
Figure 5:
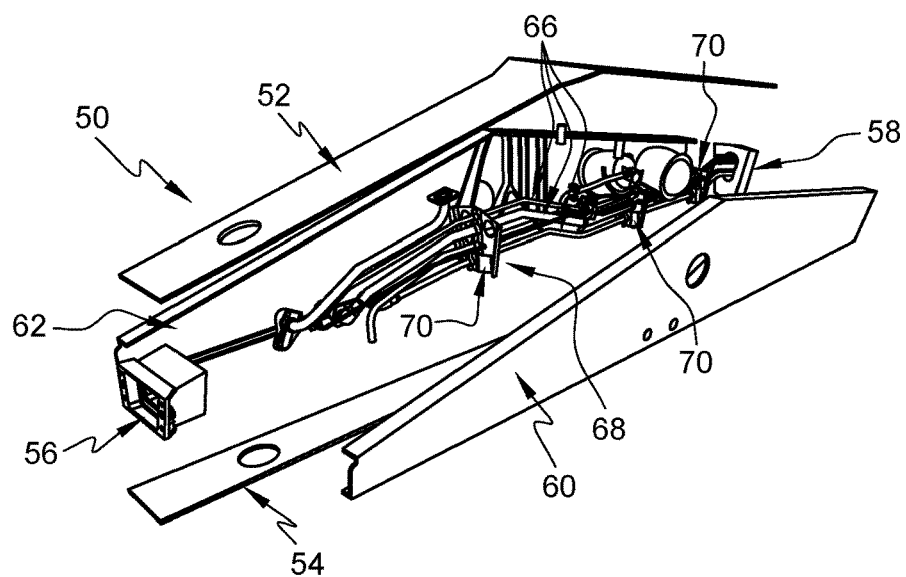
FIG. 5 is an exploded perspective view of a primary structure of an aircraft pylon, illustrating one embodiment of the invention.
Figure 10:
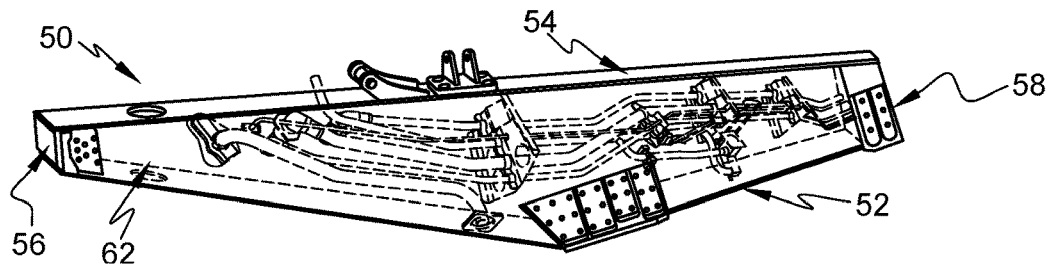
FIG. 10 is a perspective view of the primary structure shown in FIG. 9, at the end of its assembly process.
Figure 13:
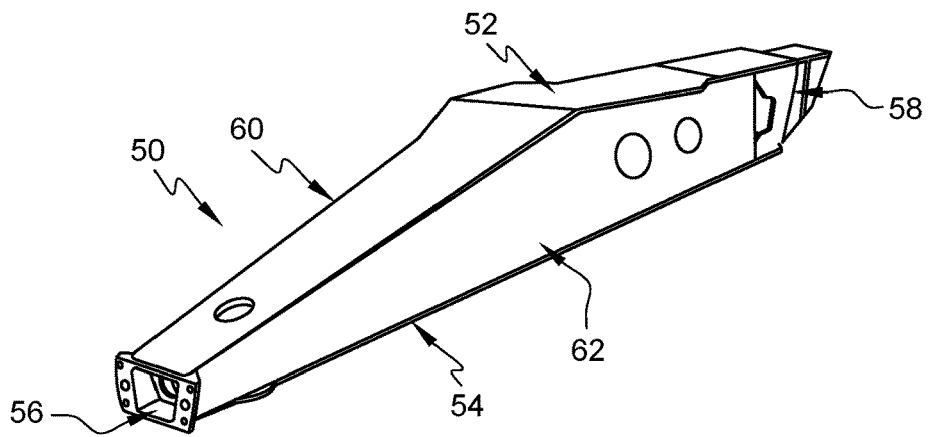
FIG. 13 is a perspective view of the primary structure shown in FIG. 12, at the end of its assembly process.

FIGS. 5, 10, 13 show a primary structure 50 of an aircraft pylon which comprises:
an upper spar 52,
a lower spar 54,
a front reinforcement 56 which connects a front end of the upper spar 52 and a front end of the lower spar 54,
a rear reinforcement 58 which connects a rear end of the upper spar 52 and a rear end of the lower spar 54,
first and second lateral panels 60, 62, which connect the upper and lower spars 52, 54 which are arranged on either side of the front and rear reinforcements 56, 58.

According to one embodiment, the primary structure 50 comprises at least one intermediate reinforcement 64, connecting the upper and lower spars 52, 54, in the form of a frame arranged in a transverse plane.

The aircraft pylon also comprises a secondary structure that caps the primary structure 50 and is spaced apart therefrom, at least one internal system 66 positioned at least partially within the primary structure 50, and at least one external system positioned outside the primary structure 50, between the latter and the secondary structure.

Figure 7:
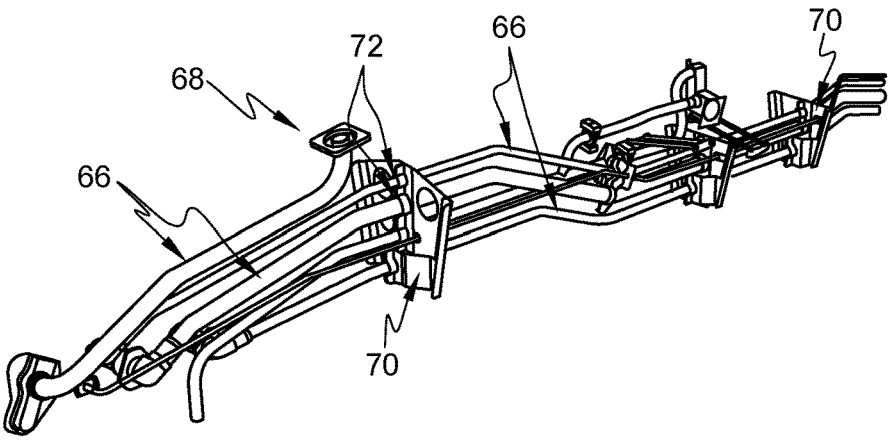
FIG. 7 is a perspective view of an internal systems module of an aircraft pylon, illustrating a first embodiment of the invention.
Figure 11:
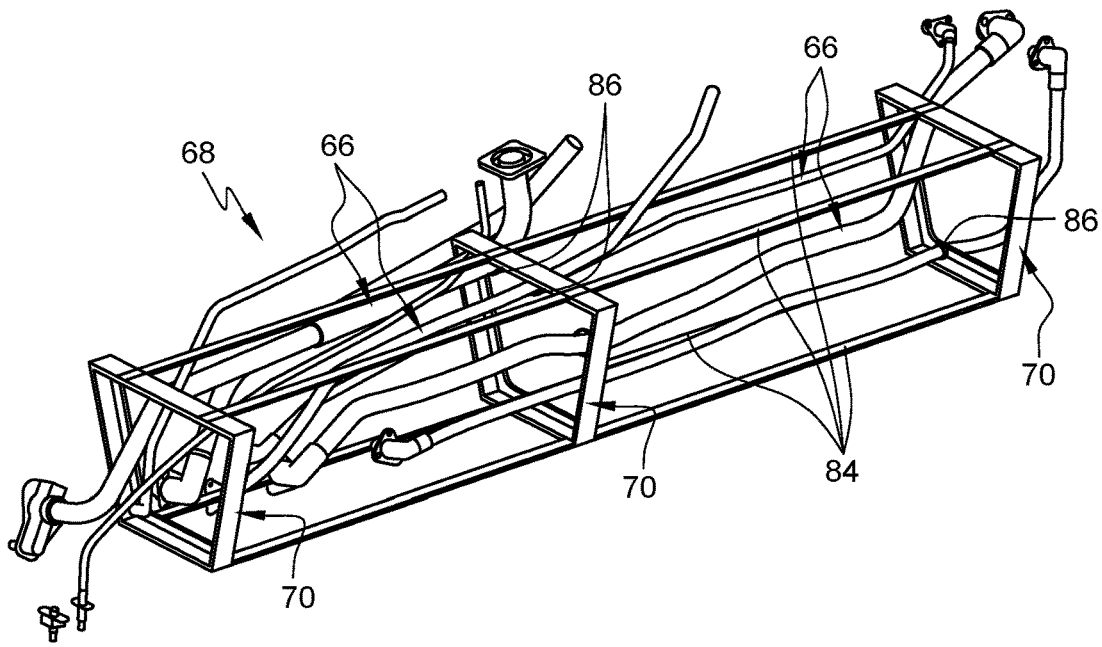
FIG. 11 is a perspective view of an internal systems module of an aircraft pylon, illustrating a second embodiment of the invention.

As illustrated in FIGS. 5, 7 and 11, the aircraft pylon comprises multiple internal systems 66 such as pipes, cable bundles, a fire extinguishing system, a drainage system. The internal systems 66 and the external systems are not described further since they may be identical to those of the prior art.

A method for assembling an aircraft pylon comprises a first step of assembling at least one upper or lower spar 52, 54 and at least one of the first and second lateral panels 60, 62 that are connected by fasteners so as to obtain a subassembly.

Figure 6:
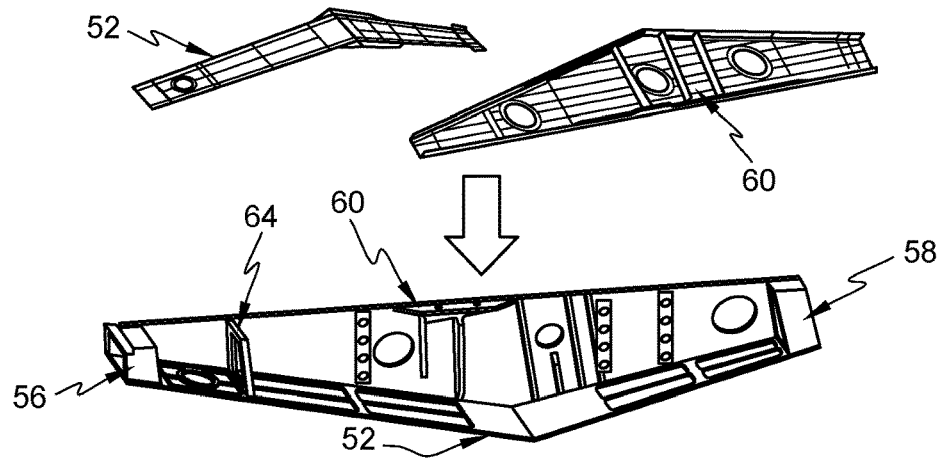
FIG. 6 is a perspective view of part of a primary structure of a pylon, illustrating a first step of a method for assembling an aircraft pylon.
Figure 9:
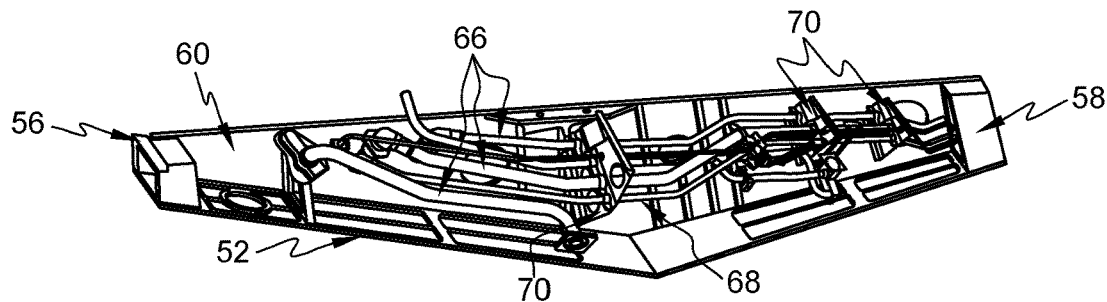
FIG. 9 is a perspective view of the part of the primary structure that can be seen in FIG. 6, in which the internal systems module, shown in FIG. 7, is positioned.

According to a first approach, shown in FIGS. 6 and 9, the upper spar 52 and a first lateral panel 60 are assembled.

According to a second approach, shown in FIG. 13, the upper and lower spars 52, 54 and a first lateral panel 60 are assembled.

According to one configuration, during this first assembly step, the front and/or rear reinforcements 56, 58, and possibly at least one intermediate reinforcement 64, are assembled and connected by means of fasteners to at least one of the upper and lower spars 52, 54, and to at least one of the first and second lateral panels 60, 62.

Whatever the approach, at the end of this first assembly step, at least one first or second lateral panel 60, 62 or at least one upper or lower spar 52, 54 is not assembled, making the interior of the primary structure 50 largely accessible and facilitating the installation of the internal systems 66.

According to a so-called "hole-to-hole" assembly approach, the elements of the subassembly among the upper and lower spars 52, 54, the first and second lateral panels 60, 62, the front, rear and intermediate reinforcements 56, 58, 64 are pre-drilled prior to the first assembly step and are not counter-drilled during this first assembly step. Thus, during this first assembly step, the elements of the subassembly are positioned relative to one another in such a way that holes for the fasteners are aligned, then these fasteners are installed.

In parallel with the first assembly step, the method for assembling the pylon includes a step of mounting an internal systems module 68 comprising at least one internal system 66 and at least one support 70 to which the internal system 66 is connected. A support 70 is an element distinct from the primary structure 20.

According to a first embodiment, shown in FIGS. 7 and 9, the internal systems module 68 comprises multiple mutually independent supports 70 that are offset with respect to one another along the longitudinal direction.

Figure 8:
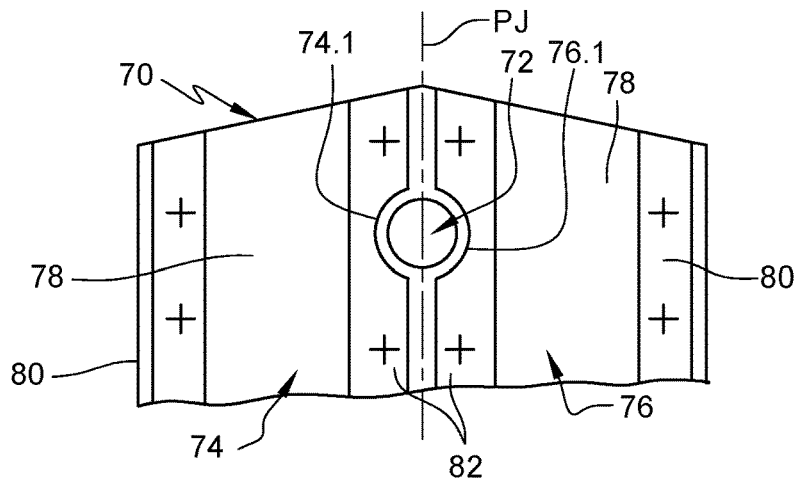
FIG. 8 is a front view of a support of an internal systems module, illustrating an embodiment of the invention.

As illustrated in detail in FIG. 8, each support 70 is positioned in a transverse plane and comprises at least one through-hole 72 through which an internal system 66 passes. According to another feature, the internal system 66 passing through the through-hole 72 is cylindrical, at least in line with the through-hole. In this case, the through-hole 72 is also cylindrical and has a diameter substantially equal to that of the internal system 66 in order to immobilize it in a transverse plane.

According to one embodiment, each support 70 comprises first and second parts 74, 76 that meet at a junction plane PJ, the first and second parts 74, 76 comprising, for each through-hole 72, first and second semi-cylindrical shapes 74.1, 76.1 delimiting the through-hole 72 when the first and second parts 74, 76 meet at the junction plane PJ. According to one configuration, after assembly of the pylon, the first part 74 is connected to the first lateral panel 60 and the second part 76 is connected to the second lateral panel 62. According to this configuration, the junction plane PJ is parallel to the first and second lateral panels 60, 62 when the support 70 is installed in the primary structure 50 and equidistant from the first and second lateral panels 60, 62.

According to one embodiment, each of the first and second parts 74, 76 of each support 70 comprises multiple elements that are joined together. Thus, each of the first and second parts 74, 76 comprises a plate 78, a bracket 80 positioned at a first side of the plate 78 configured to be connected to the first or second panel 60, 62, and a comb 82 positioned at a second side of the plate 78, opposite the first side. This comb 82 has a first flange connected to the plate 78 and a second flange in which there is formed a semi-cylindrical shape 74.1, 76.1 for each through-hole 72. The various elements of each of the first and second parts 74, 76 can be made of metal. According to one configuration, the comb 82 is made of an elastomer material in order to make the connection between the support 70 and the internal system 66 more flexible. This configuration makes it possible to increase the manufacturing tolerances of the support 70.

Figure 12:
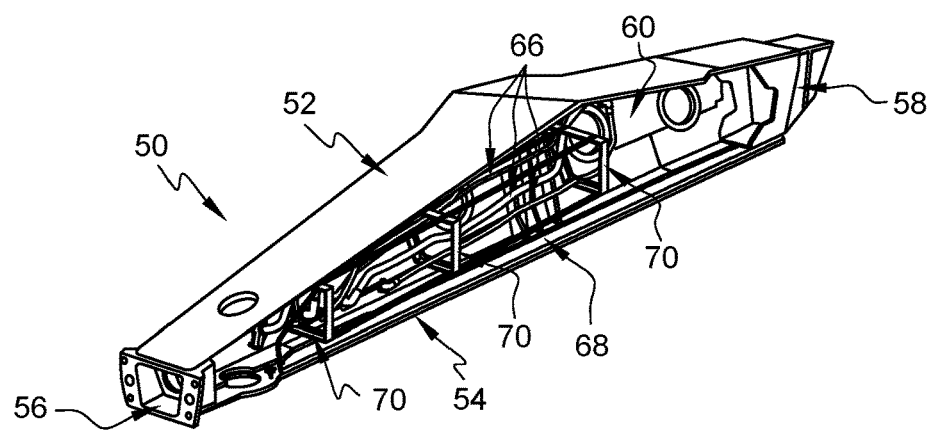
FIG. 12 is a perspective view of a part of the primary structure of an aircraft pylon, in which the internal systems module, shown in FIG. 11, is positioned.

According to a second embodiment, shown in FIGS. 11 and 12, the internal systems module 68 comprises multiple supports 70 that are offset with respect to one another along the longitudinal direction, and connected to one another by longitudinal stiffeners 84. According to this second embodiment, the supports 70 and the longitudinal stiffeners 84 form a rigid structure.

According to this second embodiment, each support 70 is in the form of a frame. The various internal systems 66 are connected to the supports 70 and/or to the longitudinal stiffeners 84 by appropriate connectors 86 in order to prevent each of the internal systems 66 from moving relative to the supports 70 and relative to the longitudinal stiffeners 84.

When the internal systems module 68 is finished, the method for assembling the pylon comprises a second step of assembling the internal systems module 68 and the subassembly assembled during the first assembly step. During this second assembly step, the internal systems module 68 is positioned relative to the subassembly and connected, using fasteners, to at least one upper or lower spar 52, 54, and/or at least one first or second lateral panel 60, 62 of the subassembly assembled in the first assembly step.

Whatever the embodiment of the internal systems module 68, all of the internal systems 66 are positioned in the primary structure in a single step, which helps to reduce in particular the time for assembling the pylon.

Each support 70 is connected to at least one upper or lower spar 52, 54, and/or at least one first or second lateral panel 60, 62 of the subassembly assembled in the first assembly step. According to a so-called "hole-to-hole" assembly approach, the supports 70 and the upper and lower spars 52, 54, to which the supports 70 are connected, are pre-drilled. Thus, each of the supports 70 is positioned relative to the elements of the subassembly assembled in the first assembly step in such a way that holes for fasteners are aligned, then these fasteners are installed.

The assembly method comprises a third assembly step that aims to close the primary structure 50 by assembling, using fasteners, the elements among the upper and lower spars 52, 54, the first and second lateral panels 60, 62, the front, rear and intermediate reinforcements 56, 58, 64 not assembled during the first assembly step. According to the first operating approach, shown in FIGS. 6, 9 and 10, the lower spar 54 and the second lateral panel 62 are connected to the upper spar 52, to the first lateral panel 60, to the front, rear and intermediate reinforcements 56, 58, 64 and to the supports 70 of the internal systems module 68.

According to the second operating approach, shown in FIGS. 12 and 13, the second lateral panel 62 is connected to the upper and lower spars 52, 54, to the front, rear and intermediate reinforcements 56, 58, 64 and to the supports 70 of the internal systems module 68.

According to a so-called "hole-to-hole" assembly approach, the elements assembled during the third assembly step are pre-drilled and are not counter-drilled during this third assembly step. Thus, the assembled elements are positioned relative to one another in such a way that holes for the fasteners are aligned, then these fasteners are installed.

The first, second and third steps of the method for assembling the pylon, described above, are carried out in this chronological order: the first step, then the second step and finally the third step.

Finally, the method for assembling the pylon comprises a step of installing and securing the external systems and the secondary structure.

At the conclusion of the assembly process, the aircraft pylon comprises a primary structure 50 and an internal systems module 68 comprising at least one internal system 66 and at least one support 70 to which the internal system 66 is connected, the internal systems module 68 being positioned inside the primary structure 50, each support 70 of the internal systems module 68 being connected to the primary structure 50. All of the internal systems 66 are integrated into the same internal systems module 68 and are positioned in the primary structure all at the same time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling an aircraft pylon comprising:
a primary structure comprising upper and lower spars and first and second lateral panels,
a secondary structure capping the primary structure,
at least one internal system positioned at least partially inside the primary structure, and
at least one external system positioned between the primary structure and the secondary structure, wherein the assembly method comprises:
a first step of assembling a subassembly comprising at least one of the upper and lower spars and at least one of the first and second lateral panels,
a step of mounting an internal systems module comprising the at least one internal system and at least one support to which the at least one internal system is connected, the at least one support being distinct from the primary structure, the at least one support comprising at least one through-hole through which the at least one internal system passes, and the at least one support comprising a first part and a second part which meet and are joined at a junction plane, the junction plane being parallel to and equidistant from the first and second lateral panels, each of the first and second parts of the support comprising a plate and a comb positioned at a side of the plate and having a first flange connected to the plate and a second flange extending outwardly transversely from each plate, each second flange delimiting a portion of the at least one through-hole through which the at least one internal system passes,
a second step of assembling the internal systems module and the subassembly assembled in the first assembly step, and during the second assembly step, said at least one support for the internal systems module is connected to at least one of at least one upper or lower spar, or at least one first or second lateral panel of the subassembly assembled in the first assembly step,
a third step of assembling any element of the primary structure not assembled in the first assembly step, and
a step of installing and securing the external systems and the secondary structure.

2. The method for assembling an aircraft pylon as claimed in claim 1,
wherein the upper and lower spars, the first and second lateral panels and the supports are pre-drilled before being assembled, and
wherein during the first, second and third assembly steps, the upper and lower spars, the first and second lateral panels and the at least one support are positioned relative to one another in such a way that holes line up in order to be able to receive fasteners, and then the fasteners are installed.

3. The method for assembling an aircraft pylon as claimed in claim 1, wherein the internal systems module comprises multiple mutually independent supports.

4. The method for assembling an aircraft pylon as claimed in claim 1, wherein the internal systems module comprises multiple supports that are connected to one another by longitudinal stiffeners.

5. The method for assembling an aircraft pylon as claimed in claim 4, wherein each support is formed as a frame, the at least one internal system of the internal systems module comprises multiple internal systems, and the multiple internal systems are connected to the at least one support or the longitudinal stiffeners by connectors, so as to keep the internal systems from moving relative to the at least one support and relative to the longitudinal stiffeners.

6. The method for assembling an aircraft pylon as claimed claim 1, wherein the at least one through-hole intersects the junction plane where the first and second parts meet, the first and second parts comprising first and second semi-cylindrical shapes delimiting the at least one through-hole when the first and second parts meet.

7. The method for assembling an aircraft pylon as claimed in claim 6, wherein the at least one internal system passing through the at least one through-hole is cylindrical at least in line with the at least one through-hole, and the at least one through-hole is cylindrical and has a diameter substantially equal to that of the at least one internal system.

8. The method for assembling an aircraft pylon as claimed in claim 6, wherein each of the comb of the first and second parts of the at least one support is made of elastomeric material, having a semi-cylindrical shape for each through-hole.

9. An aircraft pylon obtained by the assembly method as claimed in claim 1, wherein the aircraft pylon comprises:
a primary structure, and
an internal systems module comprising:
at least one internal system, and
at least one support to which the at least one internal system is connected,
said internal systems module being positioned inside the primary structure, and
the at least one support of the internal systems module being connected to the primary structure.

10. The aircraft pylon as claimed in claim 9,
wherein the at least one support comprises at least one through-hole through which there passes an internal system and first and second parts that meet at a junction plane, and
wherein the first and second parts comprise, for the at least one through-hole, first and second semi-cylindrical shapes delimiting the at least one through-hole when the first and second parts meet.

11. The aircraft pylon as claimed in claim 10,
wherein the internal system passing through the at least one through-hole is cylindrical at least in line with the at least one through-hole, and
wherein the at least one through-hole is cylindrical and has a diameter substantially equal to that of the internal system.

12. The aircraft pylon as claimed in claim 10, wherein each of the first and second parts of the at least one support comprises a comb made of elastomeric material, having a semi-cylindrical shape for the at least one through-hole.

* * * * *